(12) United States Patent
Bryant

(10) Patent No.: US 7,185,609 B2
(45) Date of Patent: Mar. 6, 2007

(54) HOG FARROWING SYSTEM FOR USE IN A COLD ENVIRONMENT AND METHOD OF USE

(76) Inventor: Robert E. Bryant, 5969 V Ave., Aurelia, IA (US) 51005

( * ) Notice: Subject to any disclaimer, the term of this patent is extended or adjusted under 35 U.S.C. 154(b) by 0 days.

(21) Appl. No.: 11/265,035

(22) Filed: Nov. 2, 2005

(65) Prior Publication Data

US 2006/0054101 A1   Mar. 16, 2006

Related U.S. Application Data

(62) Division of application No. 10/829,036, filed on Apr. 21, 2004.

(51) Int. Cl.
*A01K 1/02* (2006.01)
(52) U.S. Cl. ....................................... 119/446
(58) Field of Classification Search ................. 119/444, 119/446, 445, 448, 503, 508, 506
See application file for complete search history.

(56) References Cited

U.S. PATENT DOCUMENTS

| | | | |
|---|---|---|---|
| 1,408,906 A * | 3/1922 | Peterke | 119/446 |
| 2,280,779 A | 4/1942 | Barragy | |
| 3,028,097 A | 4/1962 | Johnson | |
| 3,269,357 A * | 8/1966 | Rezabek | 119/446 |
| 3,919,976 A | 11/1975 | Meyer et al. | |
| 3,941,093 A | 3/1976 | Sievers et al. | |
| 4,038,944 A * | 8/1977 | Tucci | 119/458 |
| 4,227,485 A | 10/1980 | Poore | |
| 4,348,986 A | 9/1982 | Marrs | |
| 4,359,967 A * | 11/1982 | Cornelson | 119/446 |
| 4,478,175 A | 10/1984 | Fisher et al. | |
| 4,616,459 A * | 10/1986 | Shubow | 52/309.12 |
| 4,700,661 A * | 10/1987 | Lawson | 119/503 |
| 4,976,221 A | 12/1990 | Yetter | |
| 5,099,793 A | 3/1992 | Sievers | |
| 5,309,864 A | 5/1994 | Harmsen et al. | |
| 5,950,565 A | 9/1999 | Guyot | |
| 6,116,190 A | 9/2000 | Kitt | |
| 6,182,610 B1 | 2/2001 | Tripp et al. | |
| 6,382,135 B1 * | 5/2002 | Van Grootheest et al. | 119/446 |
| 2002/0023332 A1 | 2/2002 | Hudak | |
| 2003/0209203 A1 | 11/2003 | Opfel | |

\* cited by examiner

*Primary Examiner*—Thomas Price
(74) *Attorney, Agent, or Firm*—McKee, Voorhees & Sease, P.L.C.

(57) ABSTRACT

A hog farrowing system for use in a cold environment includes a building providing protection from weather elements. The farrowing boxes have an entrance to permit free ingress and egress of female hogs but restrain the piglets. An alley is provided outside the boxes for the female hogs to defecate, urinate, and move to feed and water stations outside the boxes. The boxes have sides which define an inner chamber, a heat system, bedding for the female hogs to nest, and insulation covering an open top during cold environment conditions. The method utilizes the steps of promoting the female hog to utilize natural instincts, promoting the female hog to give birth to piglets close to the heat source, and protecting the piglets from crushing by using a creep area, anti-crush rods and anti-crush boards. The farrowing boxes can be modified for use in a warm season.

38 Claims, 7 Drawing Sheets

HOG FARROWING SYSTEM FOR USE IN A COLD ENVIRONMENT AND METHOD OF USE

CROSS-REFERENCE TO RELATED APPLICATIONS

This application is a Divisional of U.S. patent application Ser. No. 10/829,036 filed Apr. 21, 2004, which application is hereby incorporated by reference in its entirety.

BACKGROUND OF THE INVENTION

The present invention relates generally to hog farrowing systems and specifically to a hog farrowing system for use in cold environments which permits unrestricted female hog movement and promotes natural mothering instincts of the female hog.

Conventional farrowing systems isolate pregnant female hogs within a steel cage prior to them farrowing a litter of piglets. The cage has a bottom grate through which the female hog defecates and urinates. Water and feed troughs are provided in the cage and feed must be hand delivered to the cage. This conventional farrowing system does not permit the female hog to move except for standing up and lying down. This conventional system does not accommodate the female hog's natural mothering instinct to build a nest and consequently the female hog will rub her snout along the floor of the cage and chew on the steel bars of the cage. The associated stresses with the conventional farrowing system leads to physical injury, infection of the mammary glands, and low milk let-down. In addition, the conventional system is more labor intensive because they must have feed hand transported directly to the female hog.

Farrowing systems have been developed to counteract the stresses and pressures encountered by female hogs in conventional farrowing systems. Summer pasture hut farrowing is well suited to provide a mothering female hog with a farrowing environment free of man-made stresses. In this environment, a female hog is free-ranging in a pasture. The most obvious issues with summer pasturing of farrowing systems is that the weather elements become an issue in the fall, winter, and spring. Therefore, an objective of the present invention is to develop a farrowing system that may be used in a cold environment but have the characteristics of summer pasture hut farrowing that include unrestricted female hog movement in and out of farrowing boxes and promote natural mothering instincts such as building a nest for her litter.

Simulating pasture hut farrowing within an enclosed building is not an easy endeavor particularly in cold weather climates which may withstand typical temperatures at or below −12° F. and wind chills approaching −35° F. Accordingly, it is a further objective of the present invention to provide a farrowing system which permits female hogs to farrow and express their natural instincts during cold weather as they would in summer pasture hut farrowing.

An indoor farrowing system is still further complicated when engaging inhumane on-farm husbandry with criteria such as providing housing that is spacious enough for a mothering female hog to lie down in full lateral recumbency at one time and to move freely; providing an environment so that the female hogs may be active and social; providing the hogs continuous access to bedding with straw or corn stover in which they can root, explore, play or build nests; and providing continuous access to shelter that protects the female hog and her piglets from cold, wind and rain.

Accordingly, a further objective of the present invention is to provide a farrowing system which incorporates general humane on-farm husbandry standards for farrowing hogs.

Conventional farming techniques using cages are often used by large corporate farms. These large farms are not typically inclined to utilize humane on-farm husbandry for farrowing hogs. A family farm that owns the hogs, depends upon the farm for its livelihood, and provides the daily physical labor to manage the hogs and farm operations are more likely to adopt humane on-farm husbandry. Accordingly, it is a still further objective of the present invention to provide a farrowing system which may be easily adapted to a family farm and modify existing buildings so that a family farmer may make a livelihood from the farm.

Conventional farrowing systems have no standards which require buildings to be constructed with windows or openings that let in daylight. In addition, conventional systems are not given sufficient space to keep defecation and urination areas separate from female hog eating areas. Accordingly, a still further objective of the present invention is to provide buildings constructed with windows or openings that let in daylight and have sufficient floor space to keep the defecation and urination area separate from the feeding and drinking areas.

Conventional farrowing systems have also aspired to remove the piglets from the mother at as early an age as 2 weeks. A humane husbandry guideline is that weaning shall take place at a piglet weight or age that considers the health and welfare of both the piglets and their mothers. Although this age/weight may vary depending upon the breed of the female hog, whether the female hog is a sow (a female hog that has had a litter of piglets) or a gilt (a female hog that has not had a litter of piglets), and the health of the individual piglets, the recommended weaning age is typically six weeks with a minimum weaning age of five weeks. Accordingly, it is a still further objective of the present invention to provide a weaning of piglets that considers both the health and welfare of the piglets and their mother.

A still further objective of the present invention is to provide adequate space requirements for animals if they are not free ranging in pastures but are instead in an enclosed building structure. The Animal Welfare Institute recommends 42 square feet for a gilt and her litter. Accordingly, it is a still further objective of the present invention to provide adequate space for the female mothering hog and her litter of piglets. In addition, a further objective of the present invention is to provide apparatus to prevent two female hog from occupying the same space.

These and other objectives will become apparent from the following description of the invention.

BRIEF SUMMARY OF THE INVENTION

A hog farrowing system for use in a cold environment is provided that incorporates and utilizes the female hog's natural behaviors and instincts. These behaviors and instincts include:
  to isolate herself from the herd 24 hours before farrowing;
  to seek a warm, dry area to root and nest in;
  to begin nest building 12–15 hours before farrowing;
  to vocalize with and nurse pigs immediately after farrowing;
  to seek to defecate and urinate away from her nest;
  to find her own nest and piglets based on scent;
  to keep her piglets isolated from the herd for 10–14 days;
  after 10–14 days the female hog wants her piglets to follow her to integrate with the rest of the herd; and at 5–6 weeks the female hog begins to move away from the piglets and starts the gradual weaning process by limiting nursing time which encourages the piglets to begin consuming more dry feed.

The foregoing objectives as seen in the background of the invention and the incorporation of the above natural behaviors and instincts may be achieved with a hog farrowing system for use in a cold environment. The farrowing system has a farrowing building providing protection from the weather elements, and farrowing boxes within the farrowing building. The farrowing boxes have an entrance to permit free ingress and egress of female hogs and restrain piglets. The farrowing system has an alley outside the farrowing boxes where the female hogs defecate, urinate, and move to feed and water stations.

According to another aspect of the present invention, the farrowing building does not need to be heated or insulated. In fact, the farrowing building may be a previously built hoop barn or pole barn already present on the farm.

According to another feature of the present invention the farrowing boxes are insulated and utilize a heat system. The heat system may be a centralized system being ducted into the farrowing boxes or may utilize simple heat lamps. The heat system is located opposite an entrance to the farrowing box to permit the female hog to lie facing the entrance and give birth to piglets near the heat.

According to another aspect of the present invention the farrowing boxes have a removable door to permit free ingress and egress of piglets to defecate, urinate, and move to the feed and water stations when the piglets have achieved an age of approximately 10–14 days.

According to another feature of the present invention, the farrowing boxes may have a roller located over the removable door to prevent bruising of the female hogs large pre-farrowing underline and udder.

According to another feature of the present invention the farrowing system may have limestone bedding placed under the farrowing boxes and the farrowing boxes have an open bottom to be placed directly on the limestone. In addition to the limestone bedding, straw bedding may be placed within the farrowing boxes to permit the female hogs to build a nest within a center location of the farrowing box.

According to yet another feature of the present invention the farrowing system may have anti-crushing boards, anti-crushing bars, and a creep area placed away from the nest in the center location of the farrowing box to prevent the female hog from crushing the piglets.

According to yet another feature of the present invention, the farrowing box may adopt the Animal Welfare Institutes space requirements of a female hog that is a gilt utilizing 42 square feet per gilt and litter.

According to yet another feature of the present invention, the farrowing system places a ring in the female hog's snout to prevent rooting in the alley of the farrowing building.

The foregoing objectives may also be achieved by a method of farrowing hogs in cold environments using a farrowing building and farrowing boxes. These structures in combination permit unrestricted female hog movement and promote natural mothering instincts by the female hog. The method provides a female hog for each of the farrowing boxes approximately 24 hours before the female hog gives birth to piglets. Amongst other features, the farrowing building utilizes an alley outside the farrowing box so the female hog can defecate, urinate, and move towards feed and water stations. The method promotes the female hog's instinct to root in bedding provided inside the farrowing box to build a centrally located nest. The method also has the step of promoting the female hog to give birth to piglets close to the heat source and then protecting the piglets from crushing by use of a creep area, anti-crush boards, and rods preventing two female hogs from laying within the same farrowing box.

According to another feature of the present invention the method utilizes the step of weaning the piglets after approximately 6 weeks by removing the female hogs and then removing the piglets at the end of the farrowing cycle which is approximately 8 weeks.

According to yet another feature of the present invention, steps are provided for removing the nesting boxes, cleaning the bedding material within the building, spreading new bedding upon the farrowing building floor, and returning the farrowing boxes to an operational position.

According to yet another feature of the present invention, steps are provided for maintaining the minimum temperature in the creep area under the heat source at 70° F. and the nest within the farrowing box at 50° F. and ideally 90° F. in the creep area and 70° F. within the farrowing box.

A still further feature of the present invention is utilization of a once bred gilt system which brings a gilt to market within 11½ months as a market hog. The gilt is considered a market hog that produces a litter of pigs on her way to market.

DETAILED DESCRIPTION OF THE PREFERRED EMBODIMENT

Figure 1:
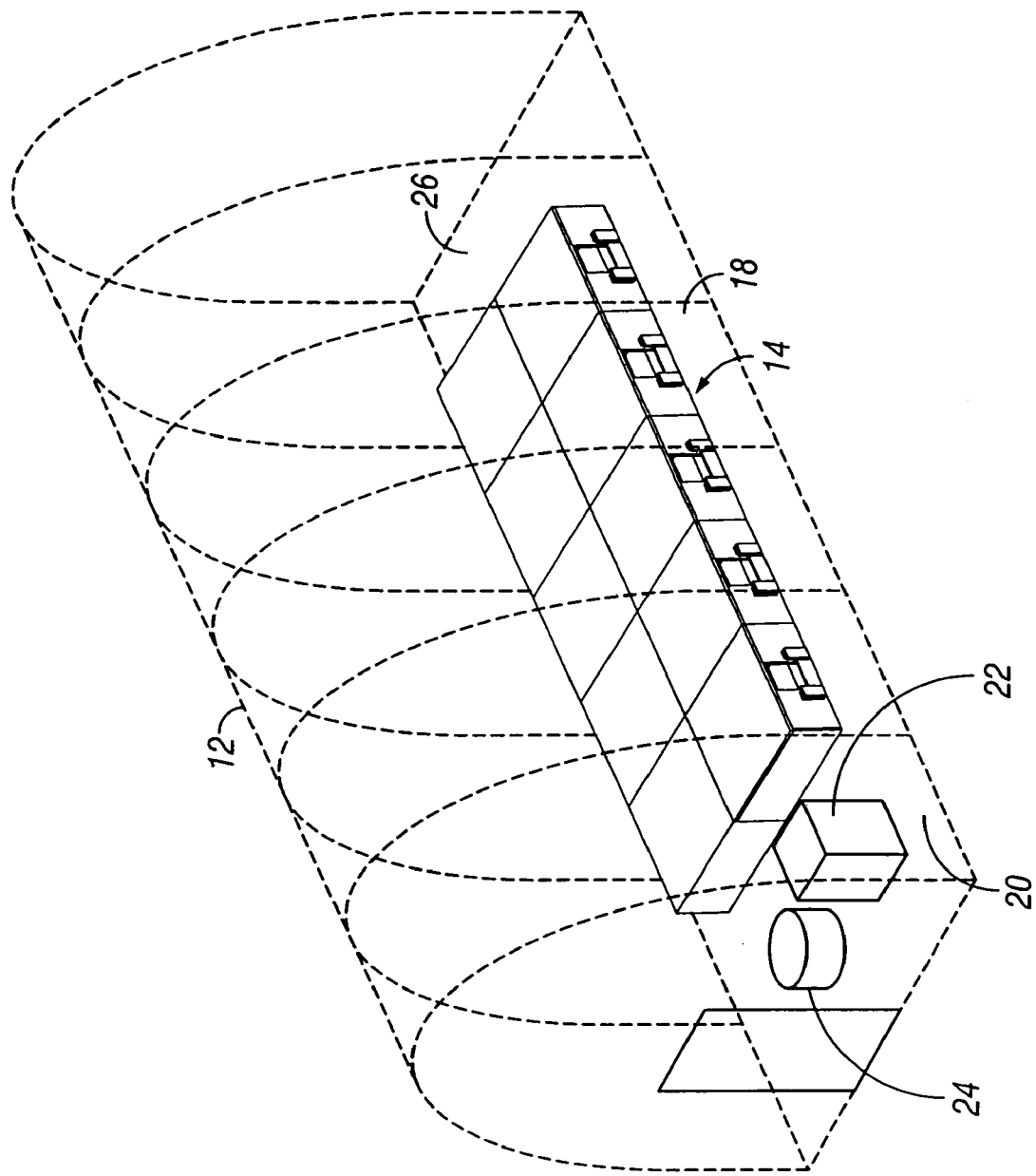
FIG. 1 is a perspective view of the farrowing system of the present invention showing a grouping of farrowing boxes within a generic hoop building.
Figure 2:
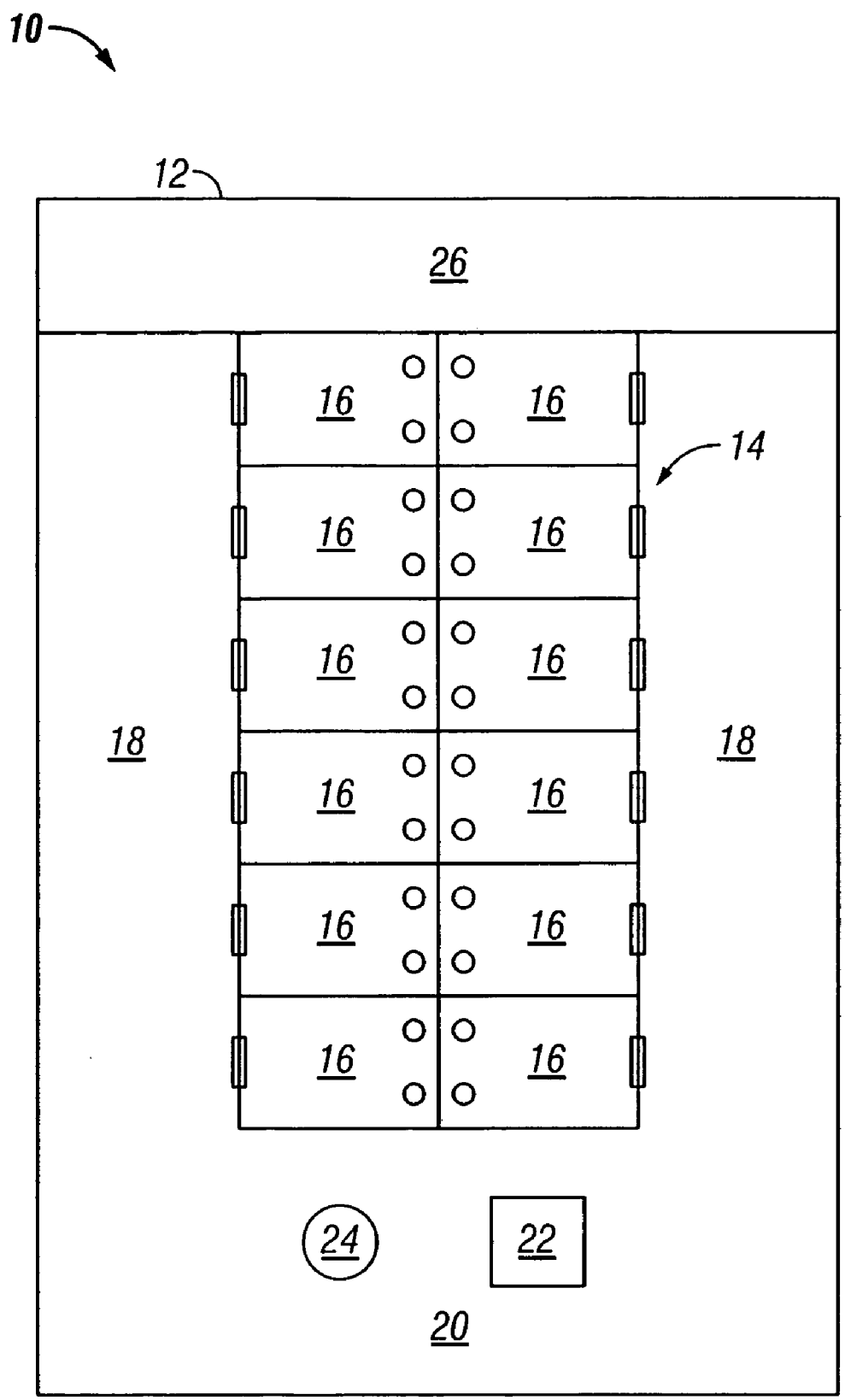
FIG. 2 is a top view of the farrowing building of FIG. 1 showing the layout of the farrowing system.

As seen in FIGS. 1 and 2, the farrowing system is generally designated in the drawings with the reference numeral 10. The farrowing system may also be referred to as the NATURAL FARROWING SYSTEM™. The farrowing system utilizes a generic farrowing building 12, typically a hoop or pole barn. The floor of the farrowing building has a farrowing box area 14 which has a series of farrowing boxes 16 grouped together. The farrowing box 16 may also be referred to as NESTING BOX™.

As illustrated, the farrowing boxes 16 are grouped together to conserve heat. Alternatively, these boxes may be separated. Also, the farrowing boxes 16 as illustrated have their backs to one another such that an entrance to the farrowing box 16 is pointed outward. The farrowing boxes 16 may also be formed in a single lane. The number of farrowing boxes 16 are determinate upon the size of the farrowing building 12 and general guidelines regarding layout of the farrowing building 12.

Layout considerations include an alley 18 outside of the farrowing box 16 that is preferably 6 to 7 feet wide. Also, a 12 feet wide floored area 20 extends along the front of the farrowing building 12 and includes a waterer 24 that is approximately 8 inches off the ground and a feeder 22 that as illustrated is 8 feet high and holds several weeks worth of feed. In addition, the farmer may desire a storage area 26 behind the farrowing box area 14 in which to store straw. The storage area 26 is optional and not required.

As seen in FIG. 2, the relative size of the components is illustrated. As illustrated, the farrowing boxes are 8 feet long and 5' 4" wide to give each farrowing box 42 square feet inside. Each alley 18 to the left and the right of the farrowing box area 14 is 7 feet wide bringing the total width of the building to 30 feet. The total length of the building is 50 feet which provides adequate storage space 26 and a forward area 20.

Figure 6:
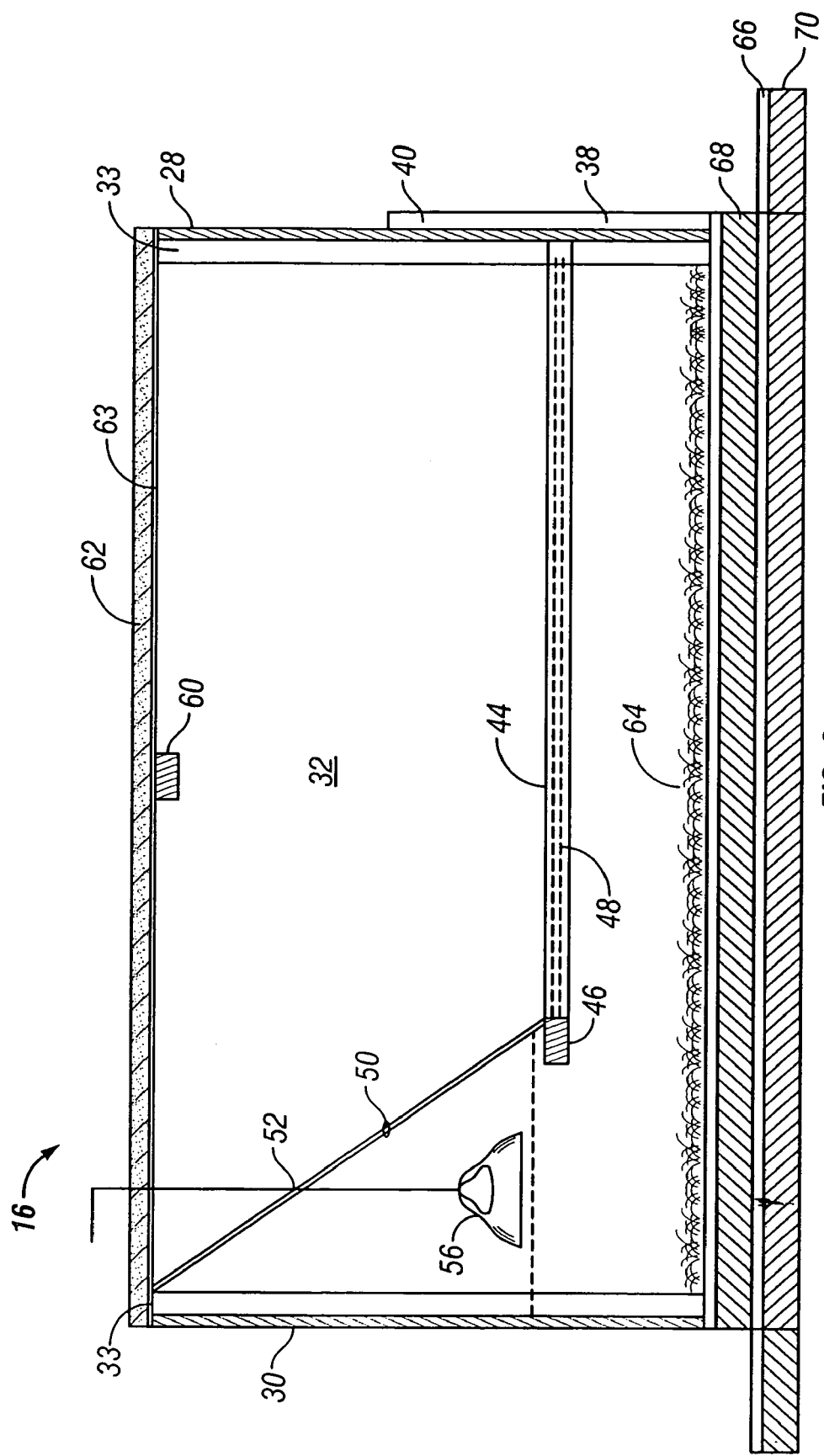
FIG. 6 is a cross sectional view of the farrowing box taken along line 6—6 of FIG. 4.

The generic farrowing building 12 as illustrated is a hoop building that protects the farrowing boxes 16 from snow, wind, and rain. The structure should be 14 feet wide to accommodate one 8 foot long nesting box and a 6 foot wide alley and have a length to accommodate as many 5' 4" farrowing boxes 16 as can be placed in the barn 12 for each female hog that is farrowing. The floor of the farrowing building 12 may be dirt, concrete, or other material. The floor is illustrated in FIG. 6 as numeral 70.

The entire floor of the building 12 is covered with a half inch of Ag lime #3. This layer is illustrated in FIG. 6 as numeral 66 and acts as a disinfectant and barrier to pathogens in the floor. The area of the floor under the nesting boxes is bedded with a 4 inch layer shell and bone dry lime stone 68 to insulate gilt. To encourage the female hog to nest, ⅓ to ½ of a small bale of long stemmed straw (20 lbs) illustrated as numeral 64 is placed in the farrowing box 16.

Figure 3:
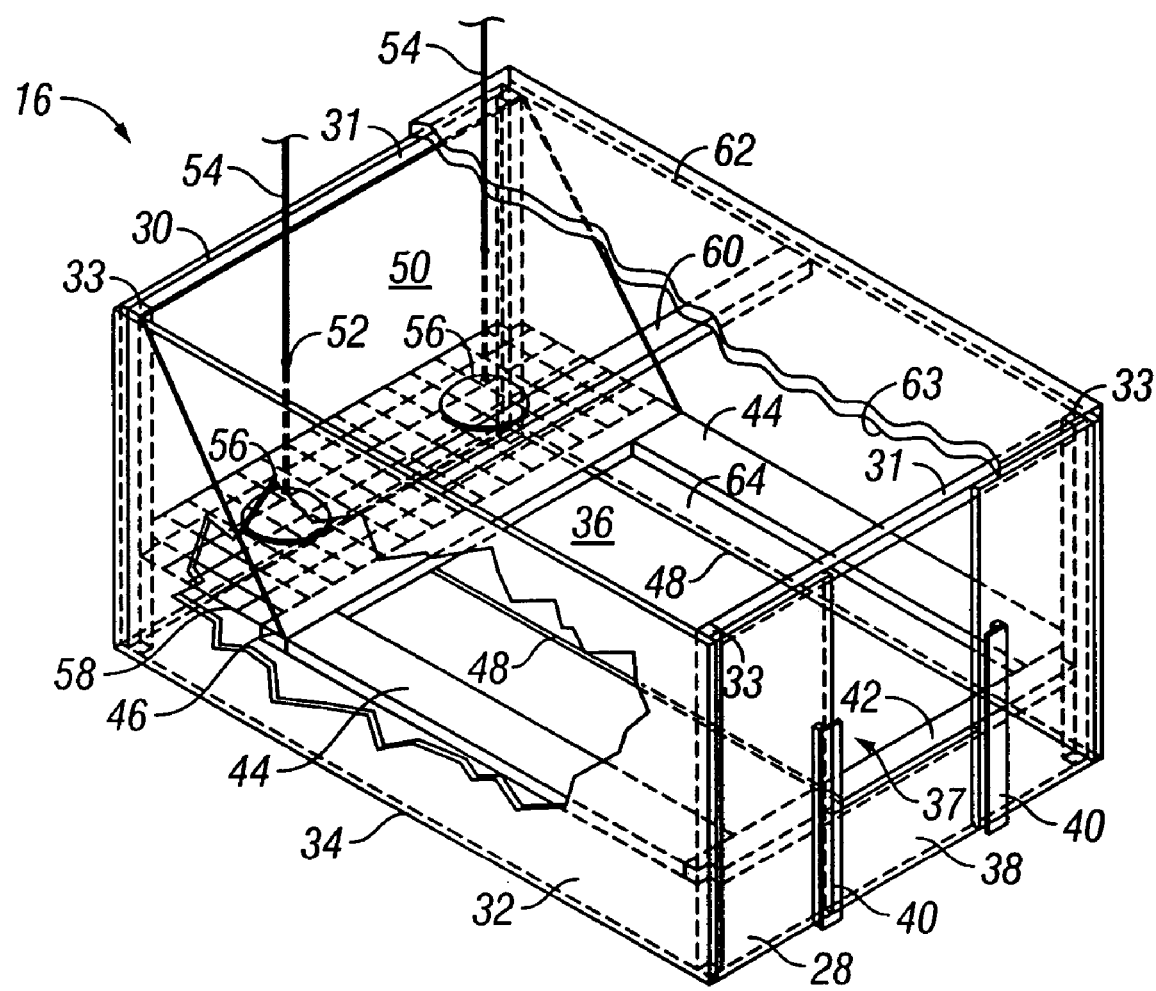
FIG. 3 is a perspective view showing the structure of the farrowing box.

As seen in FIG. 3, the farrowing box 16 has a front 28, back 30, both having cross bars 31 for structural support. Joining the back 30 to the front 28 are sides 32 which are attached to the back 28 and front 30 by corner braces 33. The front 28, back 30, and sides 32 together form an open bottom 34 and an open top 36. On the front 28 is an entrance 37 positioned over a removable door 38 that slides along grooves 40 on each side of the entrance 37. Above the removable door 38 is a 4" by 24" plastic roller 42 that helps the female hog prevent damaging her pre-farrowing underside and udder. The plastic roller 42 may be used with the above described farrowing box 16, summer pasture hut farrowing boxes, or other farrowing environments in the prior art.

On each side of the farrowing box 16 are anti-crush boards 44. These boards 44 help prevent the piglets from being crushed up against sides 32 accidentally by the female hog. Crossbars 46 extend across the front and back sides of the farrowing box. The plastic roller 42 is placed upon the front crossbar 46 during construction and spins about the front crossbar 46.

Also seen within the nesting area are rods 48. These rods prevent two female hogs from lying down and sharing a farrowing box 16 together. As mentioned earlier, gilts are social animals and will sometimes co-mingle in the same farrowing box 16 without the use of rods 48. The rods 48 enable a female hog to maneuver within the box 16 but not to lay down except within a center channel in alignment with the entrance thus preventing piglet crushing.

Figure 9:
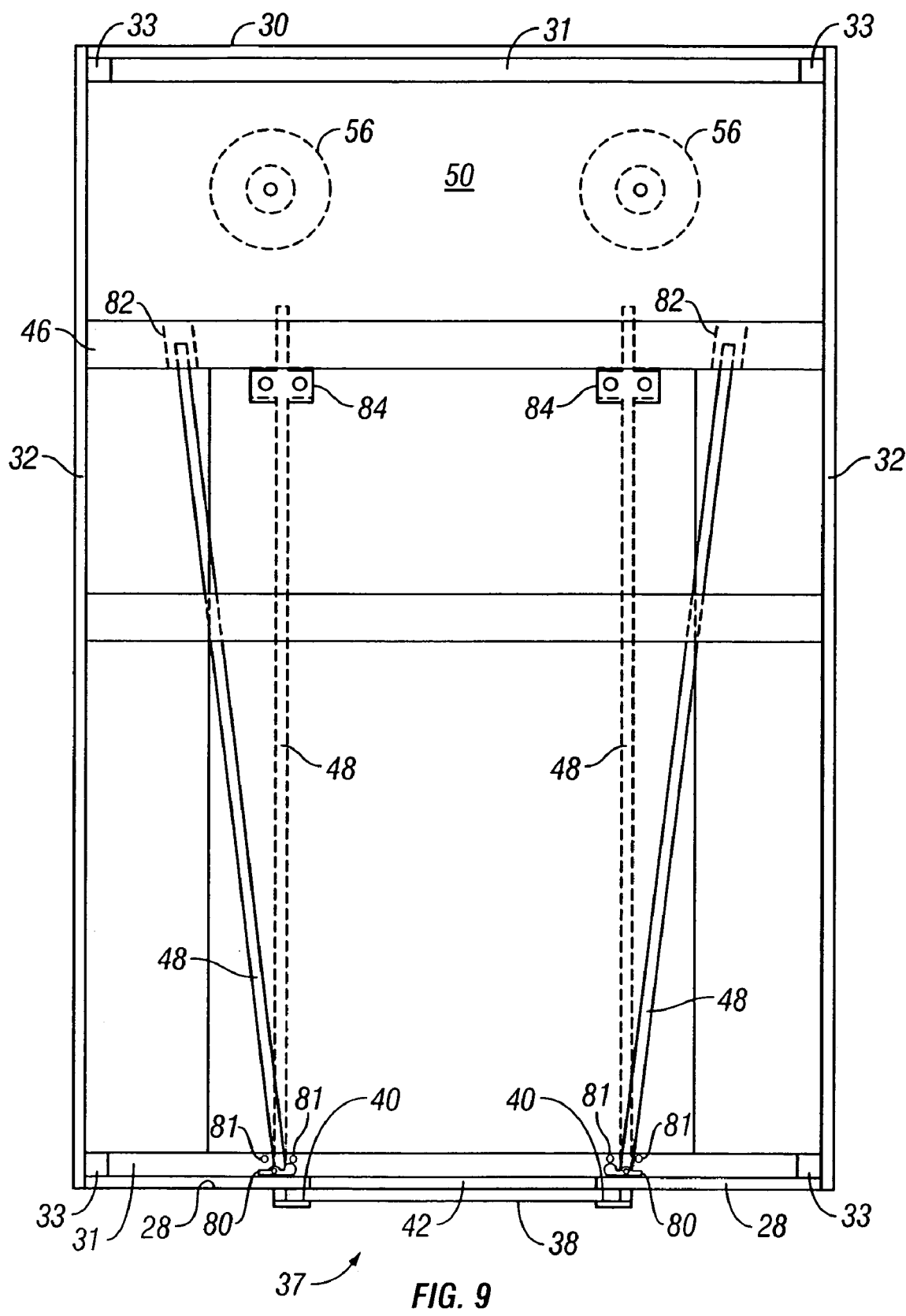
FIG. 9 is a top view of the farrowing box showing anti-crushing bars moveable between a nesting position and a nursing position.

FIG. 9 illustrates anti-crush rods 48 which are moveable between a nesting position where the rods 48 are extended outward to permit the pre-farrowing female hog to build a nest without obstructions of the rods 48 and a nursing position wherein the rods are moved parallel such that only one female hog may lay in the farrowing box at a time to nurse her piglets. The nursing position significantly prevents piglet crushing by preventing two female hogs from being with the same farrowing box 16 at the same time and to designate an area where the nursing mother may lay which further prevents piglet crushing.

The rod 48 is moveable between the nesting position and the nursing position. The rod 48 may be used with the above described farrowing box, summer pasture hut farrowing boxes, or other farrowing environments in the prior art. The rod 48 is supported by a U-bolt 81 affixed under the front crossboard 46. The rod 48 travels through the U-bolt 81 and a pin 80 placed through the rod prevent the rod 48 from moving outward into the inner nesting area. A hole 82 within the creep area crossboard 46 is raised off the ground approximately 12" to effectively remove the rod 48 from interfering with the nesting of the female hog. Downward support bars 84 are on the outside of the wooden crossboard 46 and extend about 4" downward. The downward support bars 84 permit the rod 48 to be slid into place at approximately 8" off the floor of the farrowing box 16. In addition, the bars 84 also deter the mothering hogs from pushing material into the creep area. The rod 48 is a ¾" steel pipe that will not be damaged by the female hog. The rod 48 is moved between the nesting and nursing positions by removing pin 80, pushing the rod 48 into the nesting area and then pulling the rod 48 through the entrance 37 which removes the rod 48 out of hole 82, the rod 48 is then placed into the bars 84, and finally the rod 48 is placed into the U-bolt 81 and the pin 80 placed through the rod 48 to prevent movement past the U-bolt 81. The rod 48 is moved between the nursing and nesting positions similarly but with reverse order of steps.

A sloped creep front 50 is in position at the back 30 of the farrowing box 16. This is sloped forward and has holes 52 through which wiring 54 runs to lamps 56. The sloped creep front 50 defines a creep area level with the anti-crush boards 44. A mesh wire abuts the bottom of the creep area and prevents straw bedding 64 from touching the lamps 56. The farrowing box 16 as shown is equipped with two 250 watt heat lamps 56. These heat lamps 56 maintain a minimum 70° F. temperature in the creep area and a minimum of 50° F. in the nesting/nursing area. Ideally, the heat lamps 56 maintain a 90° F. temperature in the creep area and a 70° F. in the nesting/nursing area. The heat lamps 56 may be controlled by a thermostat. The heat lamps 56 maintain these temperatures even when the external temperatures outside the farrowing building are at −12° F. with a −35° F. wind chill.

The heat lamps 56 are protected from the female hog and piglets by the solid plywood barrier 50. The wire mesh 58 is ¼ inch wire mesh and is an effective barrier below the heat lamp to prevent the heat lamps from contacting the straw bedding and to prevent the lamp from straw contact from the nesting female hog, and protect the piglets and female hog in the unlikely event that the lamps become loose or explode.

Insulation 62 is placed on the open top 36 of the farrowing box 16. Additionally, a plastic vapor barrier 63 may be placed in use with the Styrofoam insulation 62. The plastic vapor barrier 63 is typically a 6 ml clear plastic barrier. The insulation 62 is typically 2 inch thick Styrofoam panel (R10) heat loss barrier.

Figure 7:
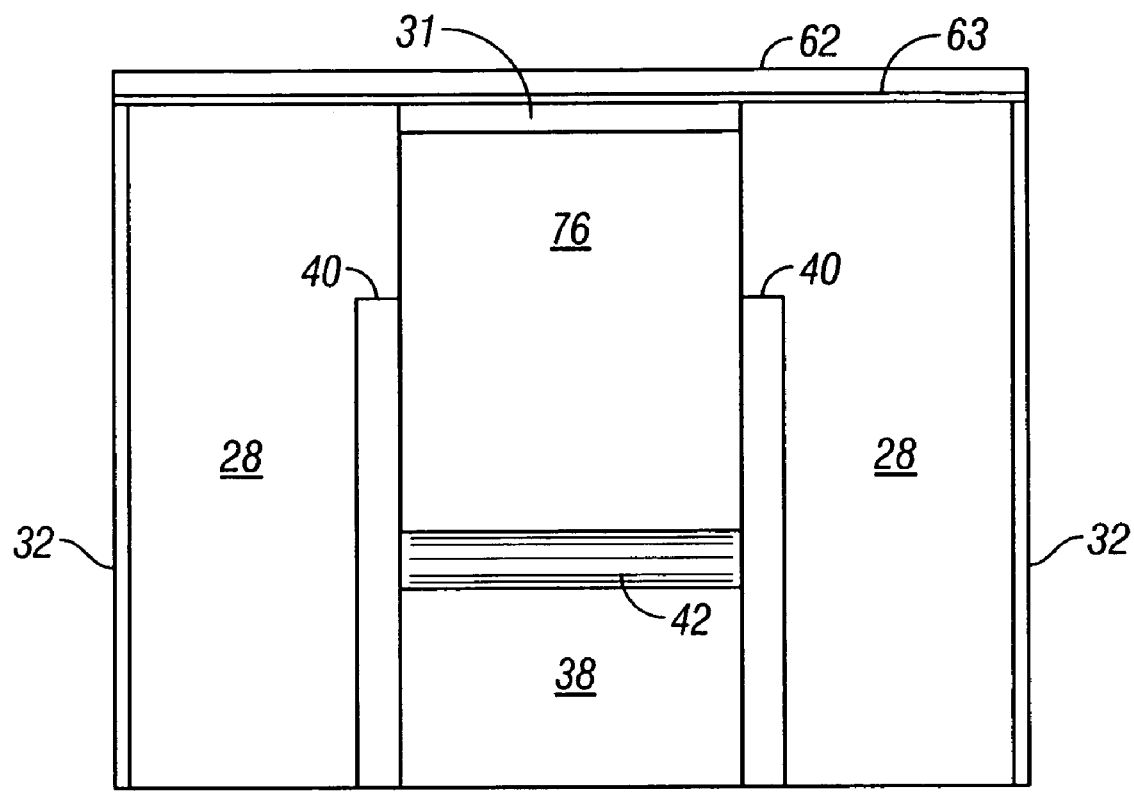
FIG. 7 is a front view of the farrowing box with a carpet over the entrance to the farrowing box.
Figure 8:
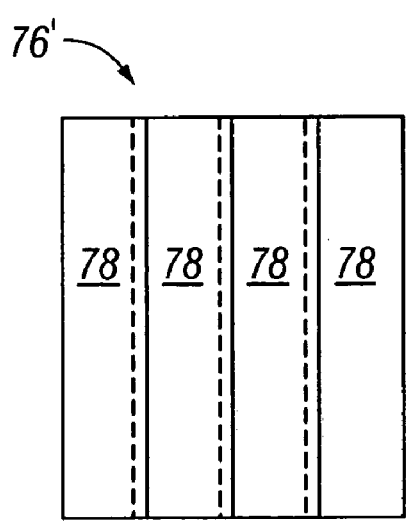
FIG. 8 is an alternate embodiment of the farrowing box as seen in FIG. 7 with plastic curtain.

A covering may be placed upon the door to prevent heat loss out of the farrowing box 16. As seen in FIGS. 7 and 8, this door 76 may be a 3×2 foot insulating carpet square or it may be insulating plastic sheets 78 overlapping. The plastic sheets 78 may provide the additional benefit of being clear and permitting a female hog to see within the farrowing box 16.

Figure 4:
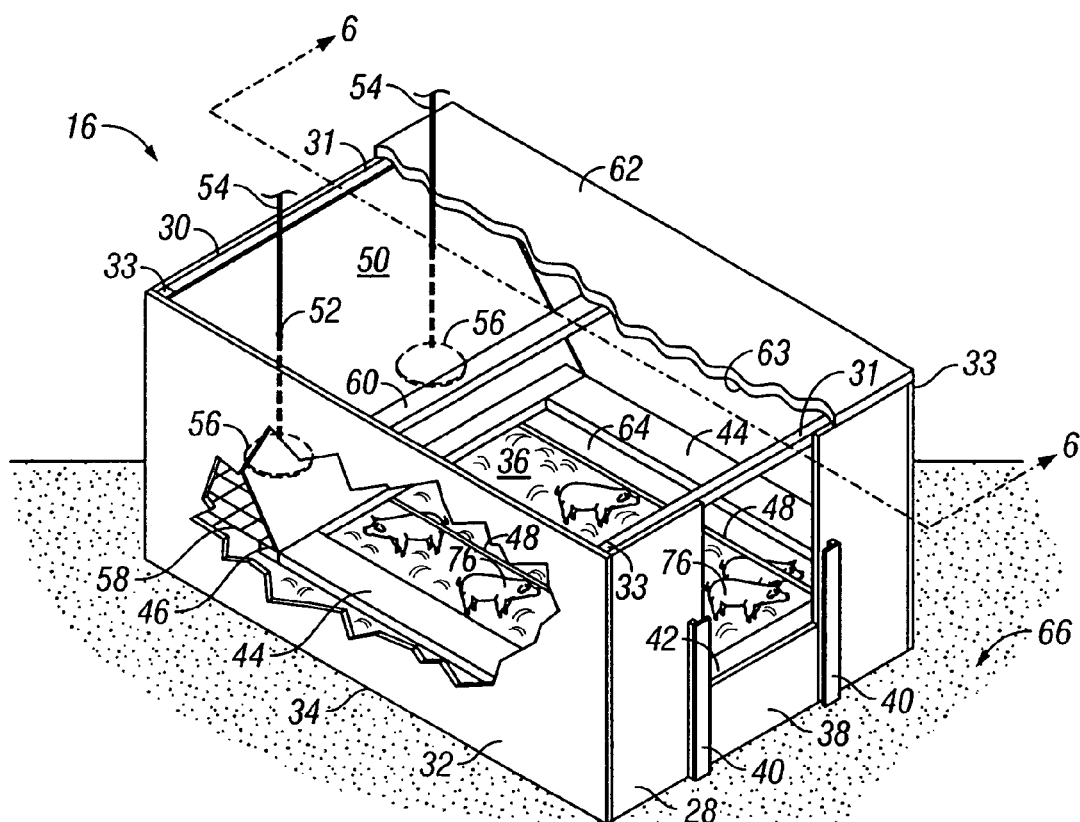
FIG. 4 is a perspective view of the farrowing box in use with piglets inside the nesting area of the box.

As seen in FIG. 4, the piglets 73 are shown standing without their mother in the nesting area. The piglets 73 may alternatively rest underneath the heat lamps in the creep area or under the anti-crush boards 44 and anti-crushing rods 48.

Figure 5:
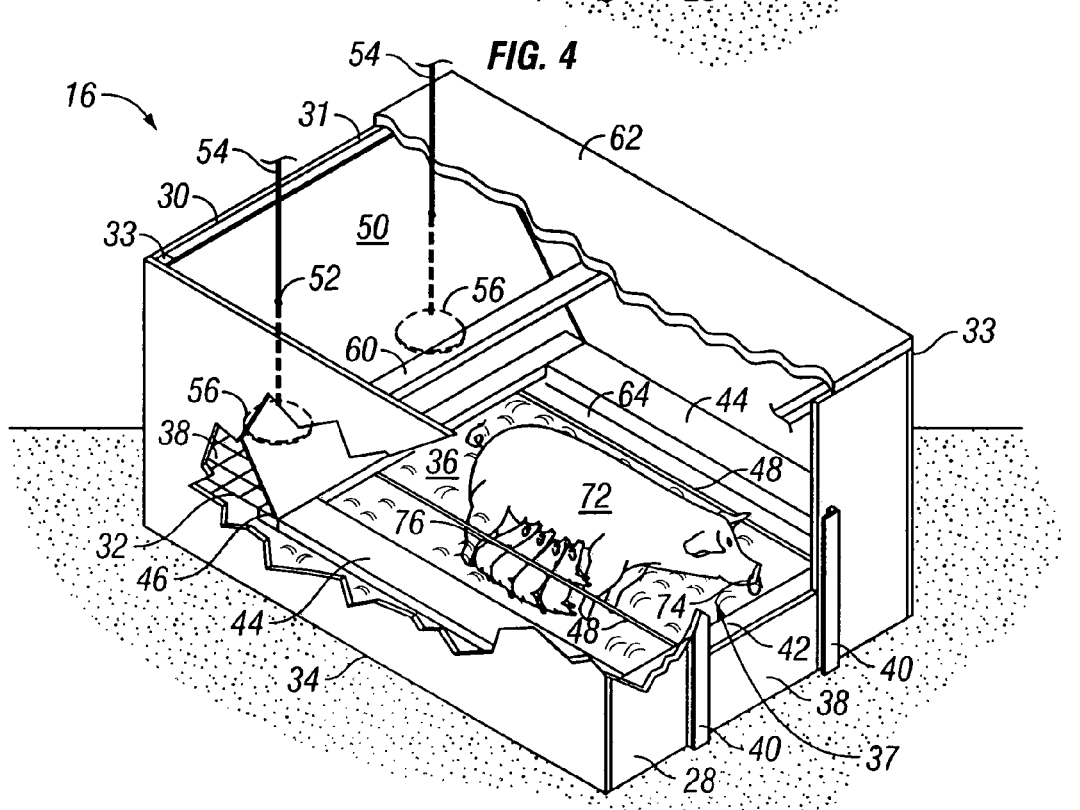
FIG. 5 is a perspective view of the farrowing box with piglets nursing with their mother.

FIG. 5 illustrates a female hog 72 which may be a sow or gilt. Sows are older female hogs which have already had one litter and gilts are female hogs having their first litter. The female hog 72 is shown with a nose ring 74. The nose ring 74 prevents the female hog 72 from rooting in the alley and encourages the female hog 72 to root and build a nest in the farrowing box 16.

The use of the farrowing system will now be described. Approximately 12 hours before a gilt is due to farrow she will start looking for a nest site and will move into the farrowing box 16 and isolate herself from other female hogs. The 4" inch plastic roller on the approximately 12 inch high entrance prevents any bruising of the female hogs 72 large pre-farrowing underline and udder. The female hog 72 will root in the 4" dry limestone layer and proceed to build a nest with the straw that is provided in the farrowing box 16. She will tend to mound the straw in the middle of the farrowing box 16 causing the newborn piglets 73 to move to the sides 32 under the anti-crushing boards 44, anti-crush bars 48, and under the sloped creep front 50. The gilt will lie in the box facing the door and the piglets 73 will be born next to the heat source 56 in the creep area under the sloped creep front 50. The female hog 72 is discouraged to farrow in the bare outside alley 18 because there is no nesting material, such as bone limestone 68 or straw bedding 64, and because by instinct wants to isolate her new piglets 73 from the other female hogs. The female hog may have a ring 74 inserted in her snout to further prevent rooting in the alley 18.

After farrowing, the female hog 72 will lie in the farrowing box 16 and vocalize and nurse her piglets 73 for about 12 hours before she will get up and go outside into the alley 18 to urinate and defecate. She will then go to the end of the farrowing building 12 and eat and drink from the feeder 22 and waterer 24.

The female hog 72 will then go back to her farrowing box by scenting her piglets 73. The female hog 72 will only go back into the farrowing box 16 holding her piglets 73 because of her mothering instinct.

The female hog 72 will nurse her piglets in the farrowing box 16 and continue to go outside over the farrowing box roller 42 to urinate, defecate, eat and drink. This results in the farrowing box 16 staying dry and warm for the piglets health and comfort.

After about 14 days the lower door 38 of the farrowing box 16 is removed and the piglets 73 will naturally start to follow their mother outside and integrate with the other piglets and mothers. The piglets will follow their mother to the end of the structure and will begin to eat and drink with her. The piglets also learn to urinate and defecate in the alley 18 and thus their farrowing box 16, that they will always return to, will stay dry and warm. The farrowing box 16 will always provide the female hog 73 and her litter a safe haven from the environment outside the farrowing boxes 16.

The piglets 73 continue to nurse their mother and eat and drink with her until about six weeks of age when they are weaned at approximately 35 pounds. Weaning is done by removing the female hog 72 from the area and by allowing the piglets 73 to stay in their normal environment which eliminates much of the weaning stress of the piglets 73.

The piglets continue to eat and drink from the self feeder 22 and waterer 24 at the end of the farrowing building. At eight weeks of age the piglets 73 are 50 to 55 pounds and marketed as feeder pigs and removed from the building.

For cleaning, the farrowing boxes 16 are removed from the building 12 by picking them up with a front end loader (not shown) attached by chain such that the cross beam 60 can be lifted up. The limestone 66 and 68, straw 64 and manure are then mechanically removed with the front end loader and spread on crop ground as valuable natural fertilizer that is dry and virtually odor free.

The cycle begins again by placing a ½" layer of Ag Lime #3 spread over the entire floor 70 of the building 12 as a disinfectant and barrier to pathogens in the floor.

The entire process is an eight-week cycle. The cycle is further enhanced utilizing a once-bred gilt system. This system utilizes a genetic line of hogs which reach reproductive maturity quickly. Ideally the female hogs are induced to go into heat by being placed near a boar such that their first heat is between 5½ to 6 months of age. The female hogs are then artificially inseminated such that they farrow at approximately 9¼ months of age. The mother may then be weaned at approximately 10½ to 11 months of age where they may then be marketed as market hogs. This is valuable because market hogs command a higher price than hogs older than one year of age.

During warm seasons, the insulation 62 and vapor barrier 63 are removed from the farrowing boxes and the heat lamps 56 turned off by thermostat. In addition, the farrowing building 12 may have windows and doors opened. Utilizing these steps, the farrowing system for cold environments may be modified to be used during the hot summer months.

As seen in the below table, the results of using the above-described cold farrowing system is as effective if not more effective than summer pasture hut farrowing.

TABLE

Comparison of results between NATURAL FARROWING SYSTEM ™ and Summer Pasture Hut Farrowing

| | NATURAL FARROWING SYSTEM ™ Feb. 18–Feb. 22, 2004* | NATURAL FARROWING SYSTEM ™ Mar. 10–Mar. 14, 2004* | ISU Summer Pasture Hut Farrowing: Nine Year Research Summary on 513 litters.** |
|---|---|---|---|
| Gilts Bred | 30 | 30 | 513 |
| Gilts Farrowed | 26 | 27 | 429 |
| Farrowing Rate % | 86.77 | 90 | 83.6 |
| Pigs Born/Gilt | 10.30 | 10.41 | 9.70 |
| Pigs Born Dead/Gilt | 0.69 | 0.78 | 0.60 |
| Pigs Born Alive/Gilt | 9.61 | 9.63 | 9.10 |
| Pigs Crushed/Gilt | 1.22 | 0.81 | 0.90 |
| Pigs/Gilt Alive >24 hours | 8.39 | 8.82 | 8.20 |
| Pigs Alive >24 Hours/ Farrowing Group | 218 | 238 | 3518 |

*Results from cold weather farrowing in hoop building temperatures tested at −12° F. with a wind chill of −35° F. below.
**Outdoor Pig Production: A Pasture Farrowing Herd in Western Iowa Honeyman, Mark and Rousch, Wayne Publication Number ISRF98-10

The invention has been shown and described above for the preferred embodiments, and it is understood that many modifications, substitutions, and additions may be made which are within the intended spirit and scope of the invention. In the foregoing, it can be seen that the present invention accomplishes at least all of its stated objectives in a cold environment and with minor modifications can be used in warm seasons to improve pasture hut farrowing results.

What is claimed is:

1. A hog farrowing box for use within a farrowing building in cold environments, the farrowing box comprising:
   a front, back and sides attached together defining an inner chamber, an open top and a bottom;
   said inner chamber being divided into a creep area and a nest area;
   said nest area having at least one movable nest area rod, moveable between a nesting position and a nursing position;
   the front of said farrowing box having an entrance to permit free ingress and egress of a female hog and restrain piglets, said entrance having a roller positioned to prevent bruising on the female hog's large pre-farrowing underline and udder.

2. The farrowing box of claim 1 further comprising a heat system wherein said heat system comprises two heat lamps.

3. The farrowing box of claim 2 wherein heat from said heat system is located opposite the entrance to permit the female hog to lay facing the opening and give birth to the piglets near the heat system.

4. The farrowing box of claim 2 wherein said heat lamps are separated by a solid plywood barrier from the female hog and piglets.

5. The farrowing box of claim 4 wherein said plywood barrier is sloped downward from the back of said farrowing box to the front of said creep area.

6. The farrowing box of claim 5 wherein said plywood barrier contains holes through which to run wiring to said heat lamps.

7. The farrowing box of claim 2 wherein wire mesh is placed horizontally under said heat lamps from the back of said farrowing box to the front of said creep area.

8. The farrowing box of claim 7 wherein the wire mesh is ¼ inch wire mesh.

9. The farrowing box of claim 2 wherein said heat system maintains the temperature in said creep area from 70–90° F. and in said nest area from 50–70° F.

10. The farrowing box of claim 9 wherein said heat system is controlled by a thermostat.

11. The farrowing box of claim 1 wherein the entrance has a removable door to permit free ingress and egress of piglets to defecate, urinate, and move to the feed and water stations after the piglets are approximately 14 days old.

12. The farrowing box of claim 1 further comprising bedding wherein said bedding is comprised of first, second, and third layered materials.

13. The farrowing box of claim 12 wherein said second layer is shell and bone builder dry limestone adapted to insulate the female hog and piglets from the cold and keep said inner chamber dry.

14. The farrowing box of claim 13 wherein said second layer is an approximately 4 inch layer.

15. The farrowing box of claim 12 is Ag Lime #3 placed on the ground to act as a disinfectant and barrier to pathogens on the floor.

16. The farrowing box of claim 15 wherein said first layer is an approximately ½ inch layer.

17. The farrowing box of claim 16 wherein said first layer is placed under a 4 inch layer of said second layer.

18. The farrowing box of claim 12 wherein said third layer is stem straw placed within said inner chamber to permit the female hogs to build a nest within a center location of the farrowing box.

19. The farrowing box of claim 18 wherein said third layer is placed said second layer.

20. The farrowing box of claim 1 wherein the farrowing box further comprises anti-crushing boards and a creep area placed away from the nest in the center location to prevent the female hog from crushing the piglets.

21. The farrowing box of claim 1 wherein the farrowing box provides approximately 42 square feet per female hog and piglets.

22. The farrowing box of claim 1 wherein said rods in said nest area extend from each side of the entrance to the back, said rods placed close enough to the bottom to permit the female hog to straddle said rods and turn around, said rods positioned to prevent two female hogs from lying within said inner chamber together.

23. The farrowing box of claim 1 further comprising insulation covering the open top wherein said insulation is a styrofoam panel heat loss barrier.

24. The farrowing box of claim 23 further comprising a clear plastic vapor barrier.

25. The farrowing box of claim 21 wherein the vapor barrier is approximately 6 ml plastic.

26. The farrowing box of claim 1 further comprising an insulative gate covering the entrance.

27. The farrowing box of claim 26 wherein the insulative gate is carpeting.

28. The farrowing box of claim 26 wherein said insulative gate is overlapping plastic sections.

29. The farrowing box of claim 1 further comprising a center brace adapted to be gripped by a front end loader and lifted.

30. A hog farrowing box comprising:
   a front, back and sides attached together defining an inner nesting chamber;
   rods extending from the front to the back, the rods placed close enough to the bottom to permit the female hog to straddle the rods and turn around, the rods positioned to prevent two female hogs from lying within the inner chamber together.

31. The hog farrowing box of claim 30 further comprising an entrance on the front to permit free ingress and egress of a female hog and restrain piglets.

32. The hog farrowing box of claim 31 further comprising a door at the entrance that can be removed to permit free ingress and egress of the piglets.

33. The hog farrowing box of claim 31 further comprising a roller positioned at the entrance to prevent bruising on the female hog's large pre-farrowing underline and udder.

34. The farrowing box of claim 30 wherein the rods are moveable between a nesting position where the rods are positioned wide to not obstruct the female hog from preparing a nest and a nursing position to prevent two female hogs from lying within the inner chamber together.

35. A hog farrowing box comprising:
   a front, back and sides attached together defining an inner nesting chamber;
   an entrance on the front to permit free ingress and egress of a female hog and restrain piglets;
   a roller positioned at the entrance to prevent bruising on the female hog's large pre-farrowing underline and udder.

36. The hog farrowing box of claim 35 further comprising a door at the entrance that can be removed to permit free ingress and egress of the piglets.

37. The hog farrowing box of claim 35 further comprising rods extending from the front to the back, the rods placed close enough to the bottom to permit the female hog to straddle the rods and turn around, the rods positioned to prevent two female hogs from lying within the inner chamber together.

38. The hog farrowing box of claim 37 wherein the said rods are moveable between a nesting position where the said rods are positioned wide to not obstruct the female hog from preparing a nest and a nursing position to prevent two female hogs from lying within the said inner chamber together.

* * * * *